UNITED STATES PATENT OFFICE.

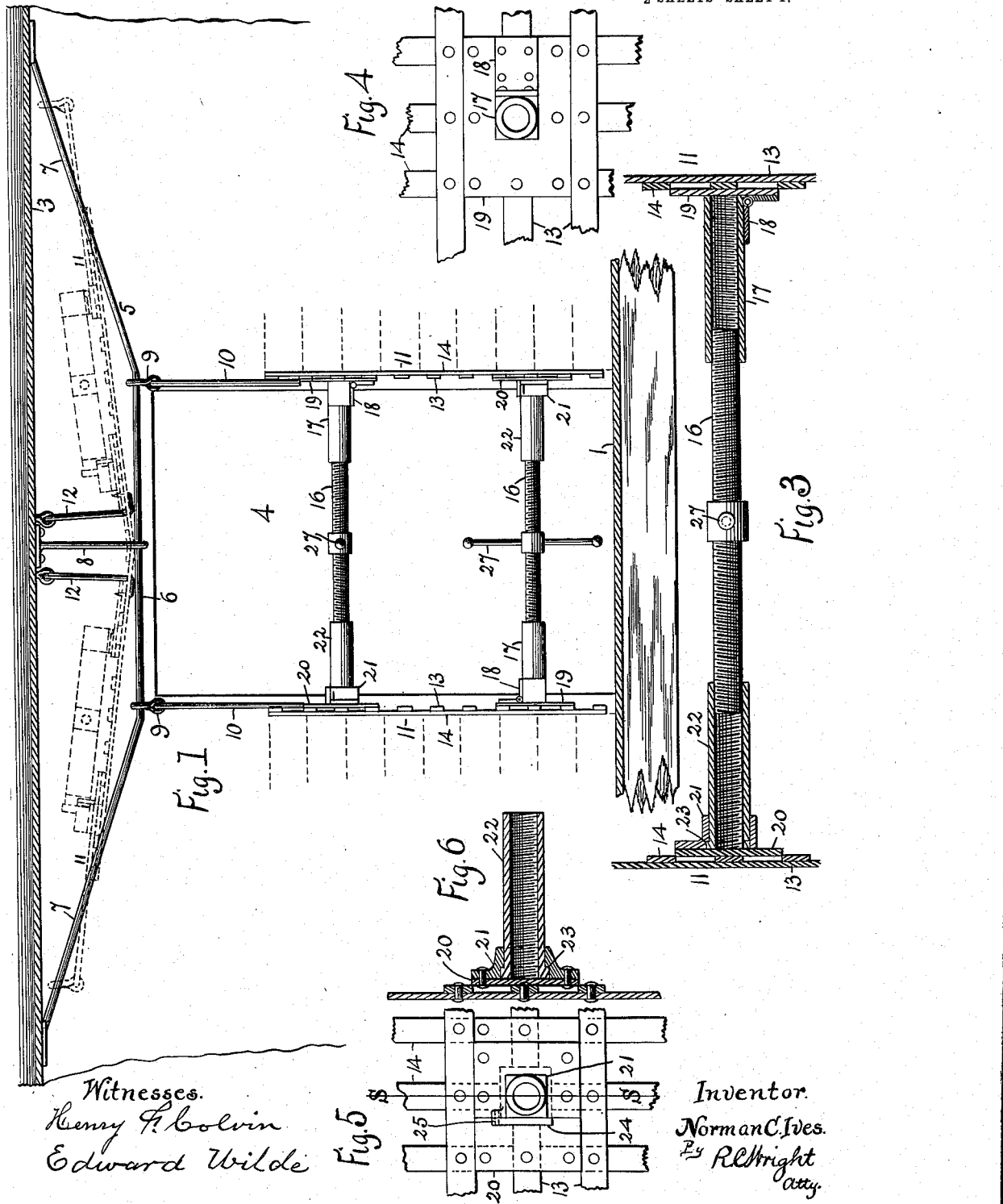

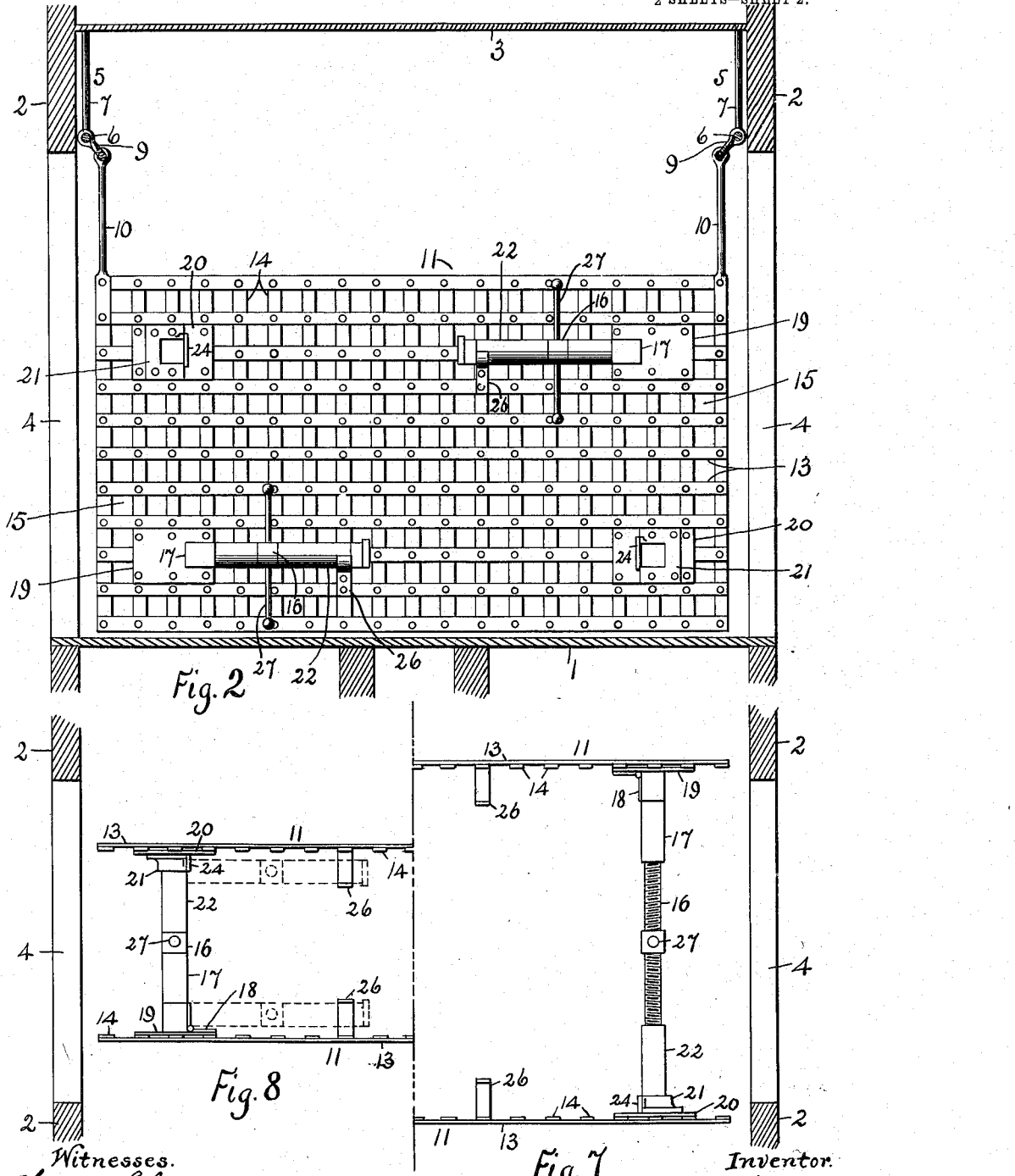

NORMAN C. IVES, OF CAMDEN, NEW JERSEY.

FRUIT-CAR BRACER.

No. 840,770.  Specification of Letters Patent.  Patented Jan. 8, 1907.

Application filed October 12, 1906. Serial No. 338,607.

*To all whom it may concern:*

Be it known that I, NORMAN C. IVES, a citizen of the United States, residing at Camden, in the county of Camden and State of New Jersey, have invented certain new and useful Improvements in Fruit-Car Bracers, of which the following is a specification.

The object of this invention is to secure fruit-packages in transit from being shifted from their positions as they are packed for transportation, which is usually for long distances.

The jarring of the car, and especially its sudden stopping and starting, tends to move the packages endwise of the car, as a space is left unoccupied across the car opposite its side doors. Heretofore this space has been occupied by temporary wooden posts, braces, &c., nailed together between the packages to secure them; but the unsubstantial nature of the material used and the inefficient means to secure it together and to the car frequently results in its total derangement during a long journey, and in consequence the packages are shifted and knocked about, and the fruit arrives at its destination in a damaged and unsalable condition.

The means herewith presented is designed to be a substantial construction permanently and securely attached to the car with means for storing it out of the way when the car is used for other than fruit transportation or on return trips and not like the temporary bracing heretofore in use, newly furnished and applied with each shipment, and a total loss at destination.

The invention is illustrated in the accompanying drawings, in which similar reference-figures indicate similar parts in all the views, in which—

Figure 1 is a central longitudinal section of a portion of a car, showing the bracer when extended to secure the packages from shifting. Fig. 2 is a central cross-section of a car with one side of the bracer in operative position. Fig. 3 is a top view of a bracer-screw with its sleeves in section. Fig. 4 is an end view of one of the hinged sleeves. Fig. 5 is an end view of one of the sleeve-pockets. Fig. 6 is a section of a sleeve and its pocket on line S S, Fig. 5. Fig. 7 is a horizontal section of a portion of a car with a top view of one-half of a bracer in its extended or operative position. Fig. 8 is the same section of a car as Fig. 7 with a top view of one-half of a bracer in its position before its extension.

The matter herewith presented, both as to illustration and description, presents the best form of the physical embodiment of the invention which has been devised at the present time; but by reason of the absence of other specific forms it is not intended to exclude other examples and other similar modes of the application of the principle as herein set forth.

The car structure is represented by its floor 1, sides 2, ceiling or roof 3, and doors 4, this being deemed sufficient illustration to identify the application of the invention to a car, there being a variety of cars of varied constructions.

To the ceiling 3 and, if necessary, therethrough to the carlines and roof, or, if preferred, to the sides of the car, are secured horizontal suspension-rods 5, their central portion 6 running parallel to ceiling 3 and the end portions 7 running diagonally and secured to the ceiling or otherwise. Each rod has a central support 8. Running freely on rods 5 are twisted links or swivels 9, to which are attached the supports 10, which carry and suspend the bracer-followers 11.

In Fig. 1 (shown in dotted lines) at the top of the car, under its ceiling, are the halves of the bracer in their positions when out of use and suspended by hooks 12 or similar means. In Fig. 1 in full lines the bracer is shown as when extended and in use holding the packages (in dotted lines) from shifting. The bracer has two followers 11, which are preferably made of bars 13 and 14, crossing each other horizontally and vertically and secured together at their junctions. Adjacent bars in each direction are spaced apart, leaving open-air spaces 15 to insure free circulation of air to the packages and their perishable contents, which is a most essential and necessary condition. The followers 11 are forced to and secured in place by right-and-left screws 16, with sleeves 17, secured for folding by hinges 18 on plates 19, secured to a follower 11. As illustrated, each sleeve has thus secured to it a sleeve and screw on diagonally opposite corners, and directly opposite each sleeve 17 and screw 16 on the other follower 11 there is a plate 20, with a pocket 21, adapted to receive a sleeve 22 on screw 16 oppositely from sleeve 17. Sleeves 22 have projections 23 at their top, bottom, and rear end sides fitting into corresponding recesses in pockets 21, and plates 24, pivotally attached at 25, close the open side of the pockets and secure the inserted sleeves. The screws and sleeves are preferably attached, as already explained, with one-half of their number on each follower and may be hinged to fold up and down, as seen in Fig. 1, or horizontally, as seen in Figs. 2, 7, 8. The screws and sleeves are folded when stored. Supports 26 secure the folded screws and followers. For the operation of the screws levers 27 are provided, and they may be either rigidly attached or inserted through the screws and movable endwise.

In Fig. 8 the followers are shown in the positions assumed when they are let down for use, the screws being swung from the dotted line to the full-line positions and secured to the pockets. Then the right and left hand screws being turned to force the sleeves 17 22 outward the followers 11 will assume their working positions, as seen in Figs. 1, 7, to bring sufficient pressure against the packages to prevent them from moving.

While the followers are arranged for four screws, this is not arbitrary, as a different number may be employed, if desired, and attached at different positions to suit different conditions.

I claim—

1. In a fruit-car, suspension-rods horizontally disposed at the top of the car, a bracer comprising a pair of intersticed followers, with means for their suspension from the rods aforesaid, and means fixedly attached to one follower and removably attached to the opposite follower, to force and hold the followers apart and against the packages comprising the car's lading.

2. In a fruit-car, a bracer comprising a pair of apertured followers with means for their suspension, opposite the door-openings, and means secured to each follower to force and secure the opposite follower against the fruit-packages comprising the car's lading.

3. In combination, a car-body, horizontal suspension-rods and a bracer composed of two followers located therein, with means for their suspension from the rods aforesaid and attachments between the followers whereby they may be adjusted and forced apart in different degrees, against the car's lading to secure it from shifting between the ends and the doors of the car.

4. In a refrigerator-car, in combination, the car-body with door-openings therefor, and a bracer comprising suspended followers arranged for horizontal movement in the car, and means attached to and between the followers, and whereby said followers may be forced apart to adjust and secure the followers in pressure-contact with the packages, in each end of the car, which comprise its lading.

5. In an inclosed freight-car, a bracer comprising apertured followers, with means for their storing at the upper part of the car when not in use; means to suspend them in a perpendicular position and across the car, and attachments whereby they may be made to move in unison, oppositely, toward or from each other, and toward or from the end of the car.

6. In a car, a pair of apertured followers, means for the support within the top of the car when in disuse; means for their extension across the car when in use; right-and-left screws with sleeves hinged to a follower, pockets upon the opposite follower, sleeves upon the screws aforesaid adapted to enter the pockets, and means to removably secure the sleeves in the pockets.

In testimony whereof I have signed my name to this specification in the presence of two subscribing witnesses.

NORMAN C. IVES.

Witnesses:
  LEWIS H. REDNER,
  R. C. WRIGHT.